US007219233B1

United States Patent
Hendriks et al.

(10) Patent No.: US 7,219,233 B1
(45) Date of Patent: May 15, 2007

(54) METHODS AND APPARATUS FOR ASSOCIATING A USER WITH CONTENT IN A COLLABORATIVE WHITEBOARD SYSTEM

(75) Inventors: Ferdinand Hendriks, Yorktown Heights, NY (US); Zon-Yin Shae, South Salem, NY (US); Belle L. Tseng, Forest Hills, NY (US); Xiping Wang, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 09/642,531

(22) Filed: Aug. 18, 2000

(51) Int. Cl.
- *H04K 1/00* (2006.01)
- *H04L 9/00* (2006.01)
- *H04L 9/32* (2006.01)
- *G06F 7/04* (2006.01)
- *G06F 17/30* (2006.01)
- *G06F 7/58* (2006.01)
- *G06K 9/00* (2006.01)

(52) U.S. Cl. ............... 713/182; 713/183; 713/184; 713/185; 713/186; 726/2; 726/3; 726/4

(58) Field of Classification Search ............... 713/202, 713/186
See application file for complete search history.

(56) References Cited

U.S. PATENT DOCUMENTS 4,993,068 A * 2/1991 Piosenka et al. ............ 713/186
5,577,120 A * 11/1996 Penzias ..................... 705/64

OTHER PUBLICATIONS

M.E. Munich et al., "Visual Input For Pen-Based Computers," Proceedings of ICPR'96, IEEE, pp. 33-37, 1996.
P. Wellner, "Interacting With Paper On The Digital Desk," Communications of the ACM, vol. 36, No. 7, pp. 87-96, Jul. 1993.
S. Elrod et al., "Liveboard: A Large Interactive Display Supporting Group Meetings, Presentations and Remote Collaboration," CHI'92, ACM, pp. 599-607, 1992.
Monochrome Interline Transfer CCD Cameras, Cohu Electronics, http://www.cohu.com, 4 pages.
Series 7700 dotCAM Specifications, Cohu Electronics, 4 pages.
Unaxis Optics Portrait, http://www.optics.unaxis.com, 7 pages.
Xerox Liveboard, http://www.snet.com, 6 pages.

* cited by examiner

*Primary Examiner*—Gilberto Barrón, Jr.
*Assistant Examiner*—Benjamin E. Lanier
(74) *Attorney, Agent, or Firm*—Douglas W. Cameron; Ryan, Mason & Lewis, LLLP

(57) ABSTRACT

Projector and camera arrangements are provided for use in electronic whiteboard systems. Specifically, the present invention provides projector and camera arrangements wherein the projector and camera share the same imaging optics. By sharing the same projection and camera optics, the distortions that affect the projection system are the same as those of the camera system. Thus, the calibration step required in conventional whiteboard systems where the projector and camera are separate, i.e., each having their own distinct optics and settings, is no longer needed. Further, the arrangements provided in accordance with the invention are self-aligning, even when lens distortions are large and even in the presence of strong perspective effects. The shared optics projector and camera arrangements of the invention also provide for dynamic zooming. In addition, various active and passive optical marker or lightpen designs are provided for use in electronic whiteboard systems.

23 Claims, 5 Drawing Sheets

METHODS AND APPARATUS FOR ASSOCIATING A USER WITH CONTENT IN A COLLABORATIVE WHITEBOARD SYSTEM

CROSS REFERENCE TO RELATED APPLICATIONS

The present application is related to U.S. patent application Ser. No. 09/644,980 and entitled: "Projector And Camera Arrangement With Shared Optics and Optical Marker For Use With Whiteboard Systems," filed concurrently herewith, the disclosure of which is incorporated by reference herein.

FIELD OF THE INVENTION

The present invention relates generally to a collaborative application computing system such as a collaborative whiteboard system and, more particularly, to methods and apparatus for associating a user with content in such a system.

BACKGROUND OF THE INVENTION

An electronic whiteboard system is a processor-based computing system used to input and output information associated with a software application running on the system. Typically, in accordance with such a system, one or more users "write" on the whiteboard using an electronic writing instrument, such as a lightpen. The lightpen permits the user to write with "electronic ink." Electronic ink is the term given to writing that is electronically captured from and/or electronically projected on the whiteboard without using physical ink. However, in some whiteboard systems, the "writing" may be done with actual physical ink on the whiteboard. In any case, a user's writing, as well as any other desired information, is displayed on the whiteboard which is viewable by the one or more users. The data entered on the whiteboard may then be stored for subsequent use by the application being run on the system. Examples of such whiteboard systems are: Ideaboard by 3M Inc. (http://www.3m.com/vsd/ams/11_whtbd.html); e-Beam by Electronics for Imaging, Inc. (http://www.e-beam.com/ihdex_flash.html); SoftBoard by Microfield Graphics, Inc. (http://www.softboard.com/); SMART Board (htttp://www.smart-board.co.uk/product/index.html); Mimio by Virtual Ink Inc. (http://www.virtual-ink.com/ns.shtml); and Liveboard, The Office of the Future: Xerox PARC, Wendy Taylor, PC Computing, pp. 192, January 1995.

A collaborative whiteboard system is a distributed computing system which includes two or more individual electronic whiteboard systems, as mentioned above, in communication with each other while running a collaborative application. While the individual systems, and thus their respective users, are remote from one another, a user at a first location is able to view information written by a user at a second location. This way, the remote users may interact as if they are in the same location. Examples of such whiteboard systems are: Netmeeting by Microsoft, Inc.; and Sametime by Lotus, Inc.

In existing whiteboard collaborations, data contributed to the overall system is only associated with the individual whiteboard system at which the contribution is made. That is, any data entered at a given location by multiple users may only be identified as data contributed at the system of the given location. Thus, unfortunately, there is no way to distinguish the individual contributors of data at a particular location. Stated another way, there currently is no way to impart identity or ownership to whiteboard data, such as pen strokes.

One existing solution is to run multiple client collaboration application programs on one computer so as to accommodate the multiple users for the one computer at one site. One major drawback is the lack of computing resources on one computer. Another disadvantage is that such a setup does not seamlessly convey that these multiple users are actually at one physical site.

Thus, in accordance with applications running on such a collaborative whiteboard system, it would be desirable to be able to separate contributions made by individual users in the collaborative system. That is, it would be desirable to be able to identify which user in the distributed system entered which whiteboard data.

SUMMARY OF THE INVENTION

The present invention provides methods and apparatus for associating a user with content in a collaborative application computing system, such as a collaborative whiteboard system. Thus, the invention is applicable, for example, to situations including multiple users or groups of users at disparate locations who wish to (or must) work together using a collaborative whiteboard system. The collaborative system may be a distributed network of collaborative computers processing shared data. At each collaborative computer, one or more users contribute to the shared data. Thus, the invention answers the question: "who is writing?," as well as: "who wrote what?," in the collaborative system.

Accordingly, the present invention associates an identity of the contributed data with the user who contributed that data, and not just with the collaborative computer. This enables multiple users at one collaborative computer to contribute to the shared data such that each user's contribution can be distinguished, acknowledged and/or indexed.

In one aspect of the invention, a method for use in a distributed collaborative computing system with two or more collaborative computing devices coupled via a communication network and respectively executing a collaborative application thereon, comprises the steps of: (i) associating one or more identifiers with data units respectively entered by one or more users at least one of the two or more collaborative computing devices so that data entered by the one or more users is uniquely identifiable in the distributed collaborative computing system; and (ii) storing the data units and the one or more associated unique identifiers, the stored data units and associated unique identifier being accessible to the two or more collaborative computing devices in the distributed collaborative computing system in accordance with the collaborative application. As mentioned above, the two or more collaborative computing devices are preferably whiteboard systems.

It is to be appreciated that the associating step may be performed before, substantially contemporaneous with, or after the data units are entered by the one or more users. In one embodiment, the associating step further comprises determining an identifier to be associated with the data units entered by a user via an input device used by the user to enter the data units. In another embodiment, the associating step further comprises determining an identifier to be associated with the data units entered by a user via a personal code automatically sensed through an input device used by the user to enter the data units. In yet another embodiment, the associating step further comprises determining an identifier to be associated with the data units entered by a user via a biometric feature associated with the user entering the data units. The biometric feature may, for example, comprise a fingerprint, a handwriting pattern, a speech pattern, and/or a retinal pattern extracted from the user. Also, the biometric data may be converted to compressed form and transmitted to a pen sensing unit.

One of ordinary skill in the art will realize many advantages that flow from the teachings of the present invention provided herein. By way of example only, some of these advantages may include: (i) identification of the user who contributed data to a collaboration; (ii) multiple users on one computer to uniquely contribute to the collaboration; (iii) multiple users on one computer to simultaneously contribute to the collaboration; (iv) multiple users on one computer to use one input device to contribute to the collaboration, and maintain their user identity and user contribution; (v) multiple users on one computer to use multiple input devices to contribute to the collaboration, and maintain their user identity and user contribution; (vi) multiple users on one computer to use multiple input devices simultaneously to contribute to the collaboration, and maintain their user identity and user contribution; and (vii) multiple users on one computer to communicate with multiple users on another computer, and maintain their user identity and user contribution.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative distributed collaborative whiteboard system. However, it is to be understood that the present invention is not limited to a whiteboard system or any particular collaborative application. Rather, the invention is more generally applicable to any collaborative application computing system in which it is desirable to be able to associate a user with content so that individual contributions at any given computing subsystem in the distributed system may be identified.

Figure 1:
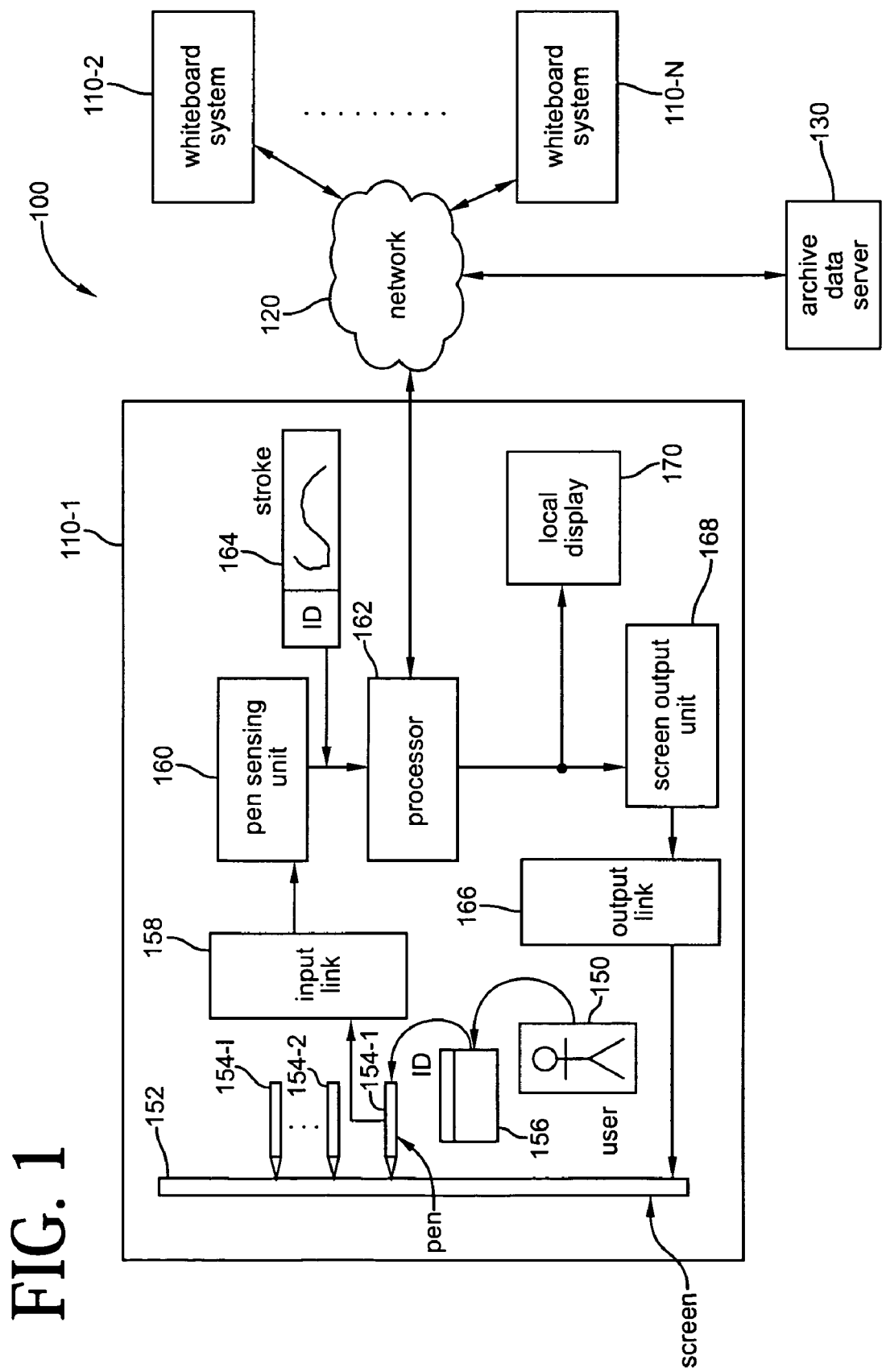
FIG. 1 is a block diagram illustrating a distributed collaborative whiteboard system according to an embodiment of the present invention.

Referring initially to FIG. 1, a block diagram illustrates a distributed collaborative whiteboard system 100 according to an embodiment of the present invention. The distributed collaborative whiteboard system 100 comprises N whiteboard subsystems (collaborative computers) 110-1 through 110-N. The N individual whiteboard subsystems are coupled via a network 120. It is to be appreciated that network 120 may be any suitable communications network for permitting data to be transferred between the individual whiteboard subsystems, e.g., a public network such as the Internet, an Intranet, or some other form of private local network. The invention is not limited to any particular network. It is also assumed that each individual whiteboard subsystem 110-1 through 110-N is capable of running a collaborative application program for permitting the individual computers to collaborate on shared data.

The collaborative whiteboard system 100 also has one or more archive functions to receive, save and broadcast the shared data. These archive functions may reside on a separate server computer 130, as shown in FIG. 1, in communication with the collaborative computers 110-1 through 110-N via the network 120. Alternatively, the archive functions may reside on one or more of the individual collaborative computers.

The collaborative computers 110-1 through 110-N participate in a collaboration by executing a collaboration application program. The particular type of collaboration application program is not critical to the invention. By way of example only, the collaborative application may provide a communication platform or environment for engineers at disparate locations to conduct a discourse on technical issues, business plans, etc. In any case, at each collaborative computer, one or more users can participate in the collaboration and each user can individually contribute to the shared data. The invention allows the collaboration application to permit simultaneous contributions by the collaborative computers, as well as simultaneous contributions by the users. Consequently, two or more users at one collaborative computer can simultaneously manipulate the shared data. As will be explained in detail below, the above operations are made possible by uniquely associating a user with his/her contributed content.

As each user contributes to the shared data, the collaborative computer 110 communicates the user-contributed data and a corresponding user identification to the archive function (server 130), which stores the shared data. Consequently, each portion of the user-contributed data in the shared data is associated with the contributor through the user identification. Advantageously, this allows differentiation of contributors to the shared data based on the user and not just the collaborative computer. Thus, one or more users can participate from one collaborative computer 110 and maintain his/her user identity on the distributed system 100. Furthermore, the collaborative computer may include more than one input device to accommodate multiple users.

FIG. 1 also illustrates, in detail, functional components of one of the N individual whiteboard subsystems or collaborative computers 110. As shown, the collaborative computer 110 may comprise a whiteboard screen 152, lightpens 154-1 through 154-I, user identification (ID) unit 156, input link 158, pen sensing unit 160, processor 162, output link 166, screen output unit 168, and local display 170. An exemplary operation of the collaborative computer 110, as shown in FIG. 1, will now be provided below.

A user 150 participating in the collaboration decides to use one of the lightpens 154-1 through 154-I that are available. Through the user identification unit 156 under the control of the processor 162, embodiments of which will be explained below in the context of FIGS. 2–6, the user's identity is associated with the data that the user contributes using the chosen lightpen. The identification process for each user at a given location may be performed during an off-line setup session prior to the collaboration session, or in real-time during the course of the on-line collaboration session with other collaborative computers.

When the user touches the pen to the screen 152, the pen communicates with the processor 162 via the input link 158 and the pen sensing unit 160, and transmits its own characteristics and the user's ID. Other users may simultaneously write with other pens once they are identified. The data from all the users is preferably time-multiplexed via the pen sensing unit 160 and sent to the processor 162. Furthermore, the pen sensing unit reports the parameters such as location, pen pressure of each active pen (one that touches the screen) to the processor.

The data provided by each of the users, in the form of strokes 164, now has respective user identifiers (IDs) associated therewith. In whiteboard system implementations, a "stroke" comprises the data produced by a writing stylus from the time that the stylus first contacts the writing surface until the contact is interrupted. At a minimum, this data consists of the collection of time-ordered, quantized stylus locations. These quantized stylus locations are samples of the continuous physical stylus motion on the writing surface while in contact with the writing surface. It is common in whiteboard applications to retain the temporal ordering of the quantized locations visited by the stylus and discard the actual times at which each point was visited during writing. In addition to the stylus locations, other information may be stored such as color, pen pressure and inclination. An "atomic writing unit" (AWU) is the smallest indivisible unit upon which whiteboard operations are allowed. For example, if the AWU is a stroke, a delete operation discards the entire stroke. In principle, AWU's may be smaller than a stroke, such as a particular segment within a stroke. In most cases, however, a stroke can be considered synonymous with an AWU.

In any case, an ID is preferably associated with each AWU or stroke. The captured strokes with IDs are then transmitted over the network 120 to the data server 130. As mentioned above, the data server acts as a supervisory node to maintain the state of the whiteboards in the system 100 and for archiving purposes.

It is to be understood that the data entered by a user may also be projected on the screen 152. Data entered by the user is projected onto the screen as follows. The primary objective of the complete capture, processing and projection system is to project the strokes in the location in which they were entered by the user. A key task performed by the processor 162 is a transformation of captured stroke information such that upon output by the screen output unit 168, via output link 166 (it is to be understood that "output link" preferably refers to optical projection through the air), the strokes are projected at the precise location at which they were entered (and with minimal delay). Before this can work properly, the system typically must first be calibrated. During the calibration step, the user is asked to click on a number of known points within the screen (so-called fiducial points) from which the system computes the parameters needed to make the location of the stylus coincide with the point at which it is projected. It is desirable that the calibration be able to handle a wide range of whiteboard operating conditions. For this reason, it is desirable to choose a calibration method that uses a projective mapping, so that perspective effects can be accounted for.

It is also to be understood that the input link 158 may provide a wireless link or a wired link between the pens 154-1 through 154-I and the pen sensing unit 160. The pen sensing unit 160 may implement one or more digitizing techniques, with or without using special features of the screen.

The function implemented by the input link and pen sensing unit is that of tracking the pen parameters such as position, but also user parameters. For ease of use, a wireless link is preferable. Users generally like their whiteboard pens to look and feel like regular whiteboard markers. A convenient method of capturing one or more pen locations is to track the pens optically. This may be done by having the pen emit light, or by having the pen reflect light. The advantage of having the pen reflect light is that the pen does not need its own power source. On the other hand, a reflective pen may be more difficult to personalize. It is possible to personalize a reflective pen by virtue of the way it scatters light. For example, one pen may scatter light in a cross pattern, another in a triangular pattern, etc. This pattern may be decoded by the capture camera and the capture system using template techniques common in the field of computer vision. In the case of a light emitting pen, personalization of the pen may be accomplished by modulating the light emitted by the pen. Similarly, in the case of a fingerprint sensor equipped pen, as will be explained below, the fingerprint information is transmitted using the light emission. Thus, a light emitting pen is far more versatile in terms of the information that it can convey.

A preferred choice of components for system 110 may comprise: (i) a passive projection screen as screen 152; (ii) an active pen emitting coded infrared (IR) light as each pen 154; (iii) a charge-coupled device (CCD) camera sensitive to the IR frequency band of interest as the pen sensing unit 160; (iv) a processor running a "computer vision" algorithm, explained below, that estimates and tracks the location of the active pen(s) on the screen; and (v) a projector which projects the trace of the active pen(s) back to the location of the pens as the screen output unit 168. In this preferred embodiment, the pens do not leave physical marks on the screen, that is, the strokes made by the user are sensed by the CCD camera and projected on the screen by the projector to give the visual effect that the pen is actually writing on the screen.

The field of "computer vision," which is part of the larger field of artificial intelligence, deals with the computer interpretation of the physical world around us using capture of visible or invisible light. Important tasks dealt with by "computer vision" algorithms are image segmentation ("what objects are in a scene"), registration ("how do the various captured images relate to one another in space and time"), photogrammetry and shape recognition ("what shape do the objects have and do they match with one the system has been made aware of before"). In the present context, we use tracking which is a computer, vision task of following an object in space once the object has been found. Finding the object in the scene is commonly done in a separate well-known object acquisition phase. In our case, the object is a pen and the vision algorithm estimates the location of the captured image of the light emitted by the pen.

By way of example, the collaborative computer 110 may be implemented using projector and camera arrangements, and optical markers, as described in the U.S. patent application Ser. No. 09/644,980 and entitled: "Projector And Camera Arrangement With Shared Optics and Optical Marker For Use With Whiteboard Systems," filed concurrently herewith and incorporated by reference herein.

Further, the term "processor" as used herein is intended to include one or more processing devices, e.g., a CPU (central processing unit) or other processing circuitry, which may be utilized in a computer system employed in conjunction with the invention. Also, it is to be understood that each processor has memory associated therewith such as, for example, RAM, ROM, flash memory, a fixed memory device (e.g., hard drive), or a removable memory device (e.g., diskette). Accordingly, software instructions or code for performing the methodologies of the invention, described herein, may be stored in one or more of the associated memory devices (ROM, fixed or removable memory) and, when ready to be utilized, loaded into RAM and executed by a CPU. Further, it is to be understood that the user identification unit 156 may perform its user identifier association operations under the control of the processor 162, under control of its own dedicated processor, or under control of some other available processing resource.

Detailed descriptions of various illustrative embodiments of the user identification (ID) unit 156 (FIG. 1), and corresponding elements associated with the various embodiments, will now be explained. It is to be appreciated, however, that one of ordinary skill in the art will realize other implementations of the user 1D unit given the inventive teachings herein.

In accordance with a first embodiment, user identification is achieved by virtue of the input device (pen) that each participant uses. Thus, there is one pen per user in the system. The user actively attaches his/her identity to the pen, for example, in this embodiment, via switch settings on the pen. The user identity is now an attribute of the pen, which transmits a unique code to the collaborative system with each AWU or stroke. Preserving identity precludes sharing of input devices. The ability of the pen sensing unit to discriminate among pen identities allows simultaneous input. It is the responsibility of each processor in the system to report strokes to a server which maintains the state and archive of the whiteboard. The strokes received by the server have unique user ID's associated with them.

Figure 2:
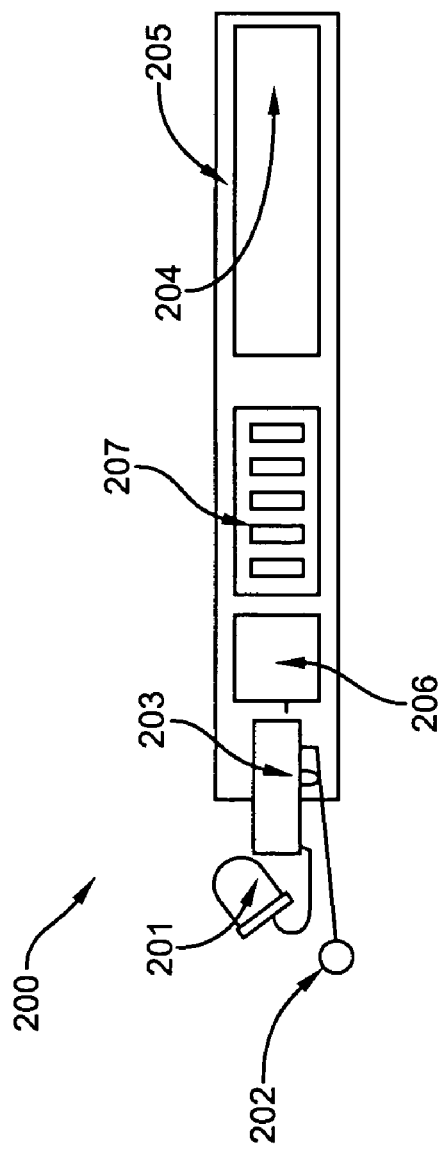
FIG. 2 is a block diagram illustrating a light pen for use in user identification in a whiteboard system according to a first embodiment of the present invention.

FIG. 2 is a block diagram illustrating a light pen for use in implementing user identification in a whiteboard system according to such a first embodiment of the present invention. As shown, a light pen 200 comprises a light source 201 used to track the motion of the pen, a low-friction nib 202 and a lever/snap type microswitch 203 for indicating contact with the screen, a power supply 204 for powering pen components, an enclosure 205 for housing pen components, driver electronics 206 for controlling operations of the pen, and a dual in-line (DIP) switch 207. It is to be appreciated that the DIP switch 207 is the element that allows each pen to be assigned its own unique ID. Thus, any conventional light pen may be configured with such a DIP switch to provide this unique ID function. Further, a light pen such as is described in the above-referenced U.S. patent application Ser. No. 09/644,980 and entitled: "Projector And Camera Arrangement With Shared Optics and Optical Marker For Use With Whiteboard Systems," filed concurrently herewith, may be employed with such configuration. In any case, as is known, the individual rocker switch elements on the switch may be toggled to generate a code representing the ID. Of course, care must be taken to ensure that the switch on each pen has unique switch element settings.

Figure 3:
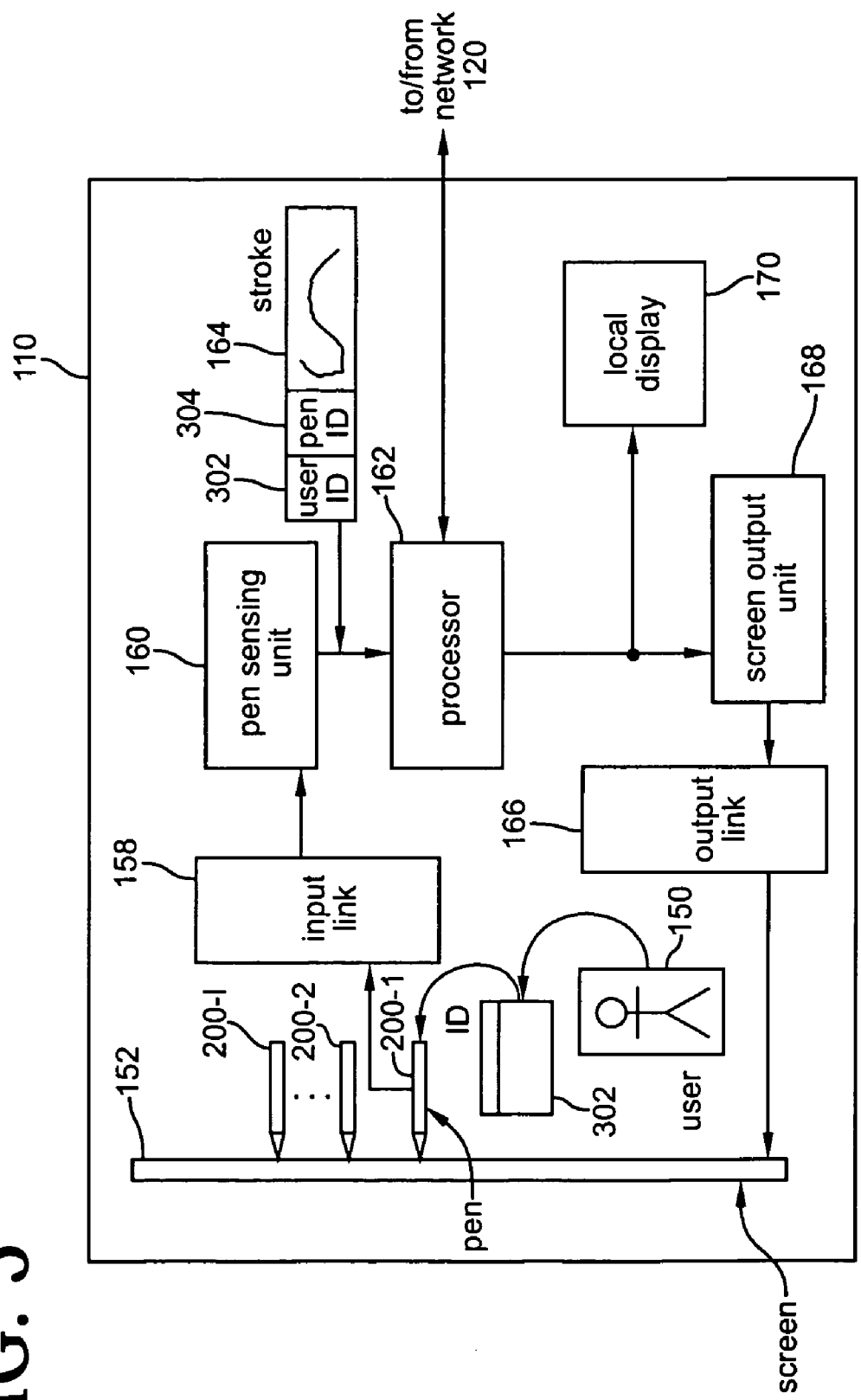
FIG. 3 is a block diagram illustrating user identification in a whiteboard system according to the first embodiment of the present invention.

Turning to FIG. 3, a block diagram depicts user identification employing light pens, as shown in FIG. 2, in a whiteboard system according to the first embodiment of the present invention. It is to be understood that all elements shown in FIG. 3 with the same reference numeral as in FIG. 1 have the same function as previously described. As shown in this embodiment, the collaborative computer 110 includes light pens 200-1 through 200-I, each with a DIP switch for setting a unique ID.

In one illustrative methodology, it is assumed that each pen has previously been set, using its DIP switch, to have a unique pen ID. Accordingly, before a user takes a pen and begins writing, the user registers with the whiteboard system by entering his user ID in association with the pen ID of the pen he/she intends to use. Registration may be through a user ID field in a graphical user interface on the local display 170 (FIG. 1). In another illustrative embodiment, the user may select a pen and set the DIP switch to a unique ID that has already been assigned and associated him/her by the system.

Accordingly, each AWU or stroke subsequently produced by a user with his/her pen will have a user ID 302 and a pen ID 304 associated therewith. The pen ID is transmitted to the pen sensing unit 160 preferably using modulation of the infrared (IR) light emitted by the pen. The system associates the user ID with the particular pen thus enabling personal identification of each contribution in the overall collaborative application.

In accordance with a second embodiment, each user transmits his/her identity to the pen by virtue of holding the pen. This embodiment makes use of a technology referred to as "personal area networks" (PANs). As is known, PAN technology, developed at IBM Corporation's Almaden Research Center (San Jose, Calif.), uses the natural electrical conductivity of the human body to transmit electronic data. Using a small transmitter embedded with a microchip, and a slightly larger receiving device, users can transmit, for example, a pre-programmed electronic business card between themselves via a simple handshake. PAN generally works based on the following principles. The natural salinity of the human body makes it an excellent conductor of electrical current. PAN technology takes advantage of this conductivity by creating an external electric field that passes a tiny current through the body, over which is carried the data to be exchanged. The current used is one-billionth of an amp (one nanoamp), which is lower than the natural currents already in the body. The speed at which the data is transmitted is equivalent to a 2400-baud modem. Theoretically, 4000,000 bits per second could be communicated using this method. More details on PAN technology may be found at http://www.research.ibm.com/journal/sj/mit/sectione/zimmerman.html.

Figure 4:
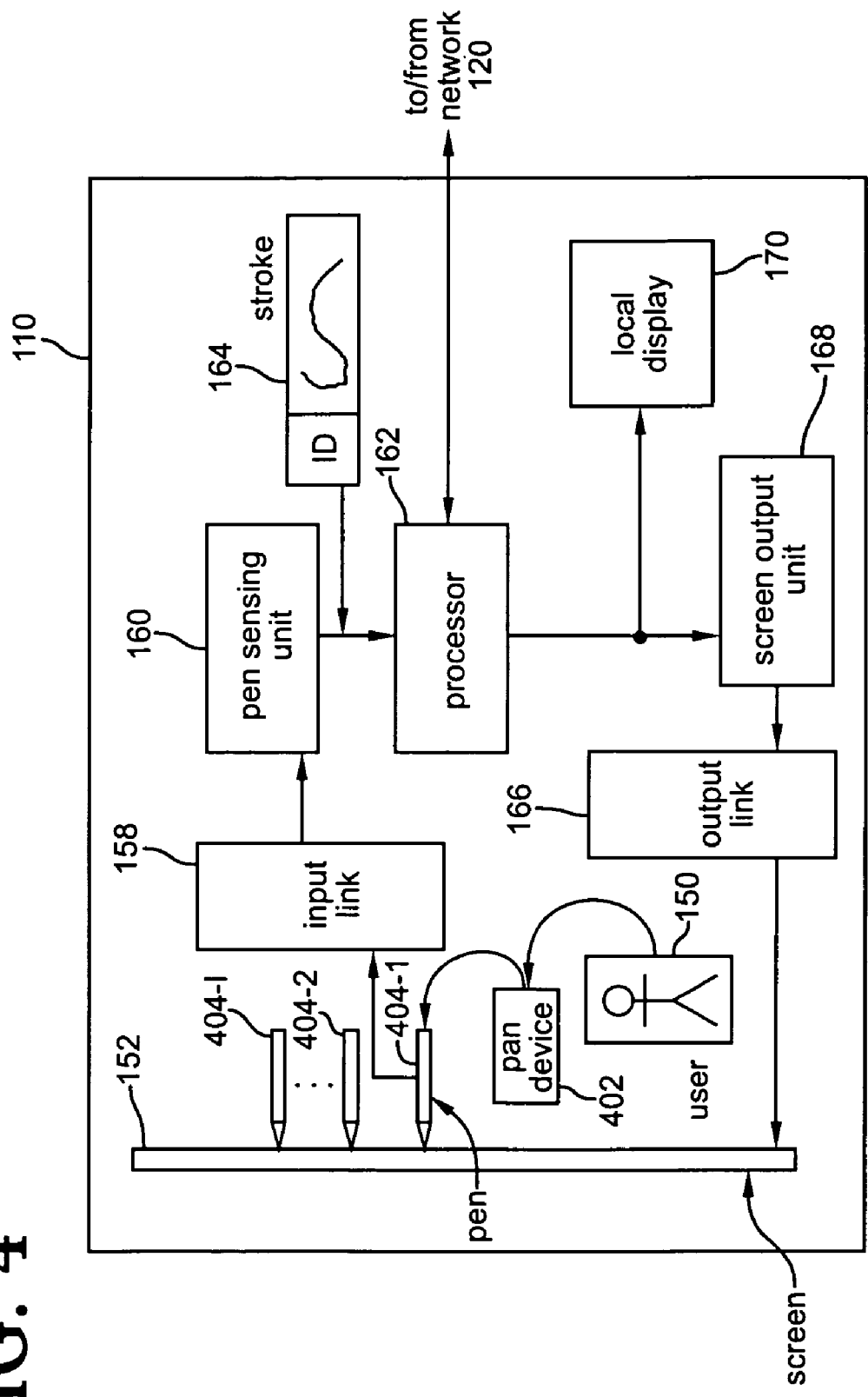
FIG. 4 is a block diagram illustrating user identification in a whiteboard system according to a second embodiment of the present invention.

Thus, using PAN technology, the pen senses the identity of the person holding it by receiving the code conducted through the finger holding the pen. FIG. 4 is a block diagram depicting user identification employing PAN technology in a whiteboard system according to the present invention. It is to be understood that all elements shown in FIG. 4 with the same reference numeral as in FIG. 1 have the same function as previously described. As shown, the user 150 may wear a PAN device 402 (transmitter). When he/she comes in contact with one of the PAN-aware pens 404-1 through 404-I, which contains a PAN receiver, a user ID is transmitted by the pen with the AWUs or strokes enabling personal identification of each contribution in the overall collaborative application.

Figure 5:
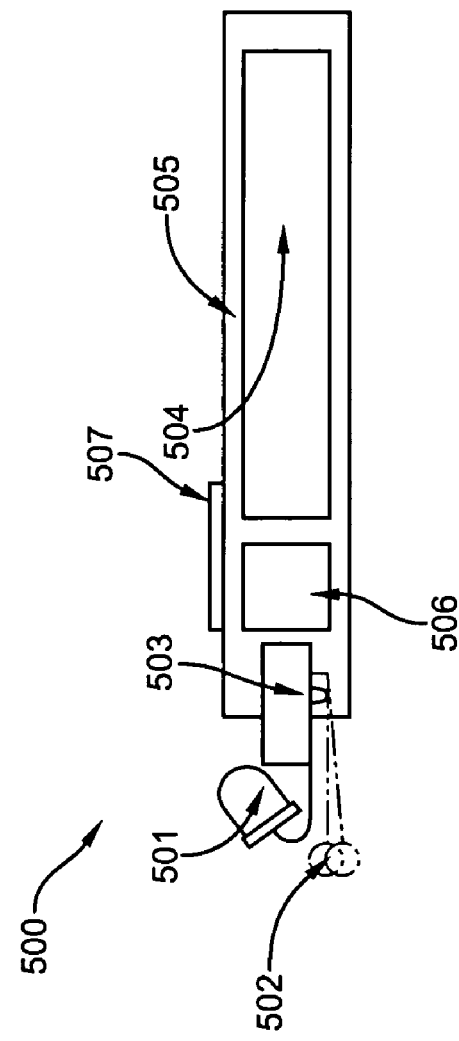
FIG. 5 is a block diagram illustrating a light pen for use in user identification in a whiteboard system according to a third embodiment of the present invention.

In accordance with a third embodiment, the user's identification is determined from a biometric attribute associated with the user such as his fingerprint. FIG. 5 is a block diagram illustrating a light pen for use in implementing user identification in a whiteboard system according to such a third embodiment of the present invention. As shown, a light pen 500 comprises a light source 501 used to track the motion of the pen, a low-friction nib 502 and a lever/snap type microswitch 503 for indicating contact with the screen, a power supply 504 for powering pen components, an enclosure 505 for housing pen components, driver electronics 506 for controlling operations of the pen, and a fingerprint sensor 507. Any conventional light pen may be configured with such a fingerprint sensor. Further, a light pen such as is described in the above-referenced U.S. patent application Ser. No. 09/644,980 and entitled: "Projector And Camera Arrangement With Shared Optics and Optical Marker For Use With Whiteboard Systems," filed concurrently herewith, may be employed with such configuration.

In any case, the key element in this embodiment is the biometric sensor in the form of the fingerprint sensor. Fingerprint sensor 507 transmits the fingerprint of the light pen user, to the local processor. The fingerprint data may be compressed in the pen or later in the processor. As long as a finger is in contact with the sensor, identification data is available. No action on the part of the user is required other than to allow the pen to sense the fingerprint. This embodiment shows the fingerprint chip installed on a light pen which emits light (preferably IR). To keep the fingerprint private, driver electronics 506 may compress and encrypt the fingerprint data. The data is transmitted (preferably over an IR link) to the local processor.

Figure 6:
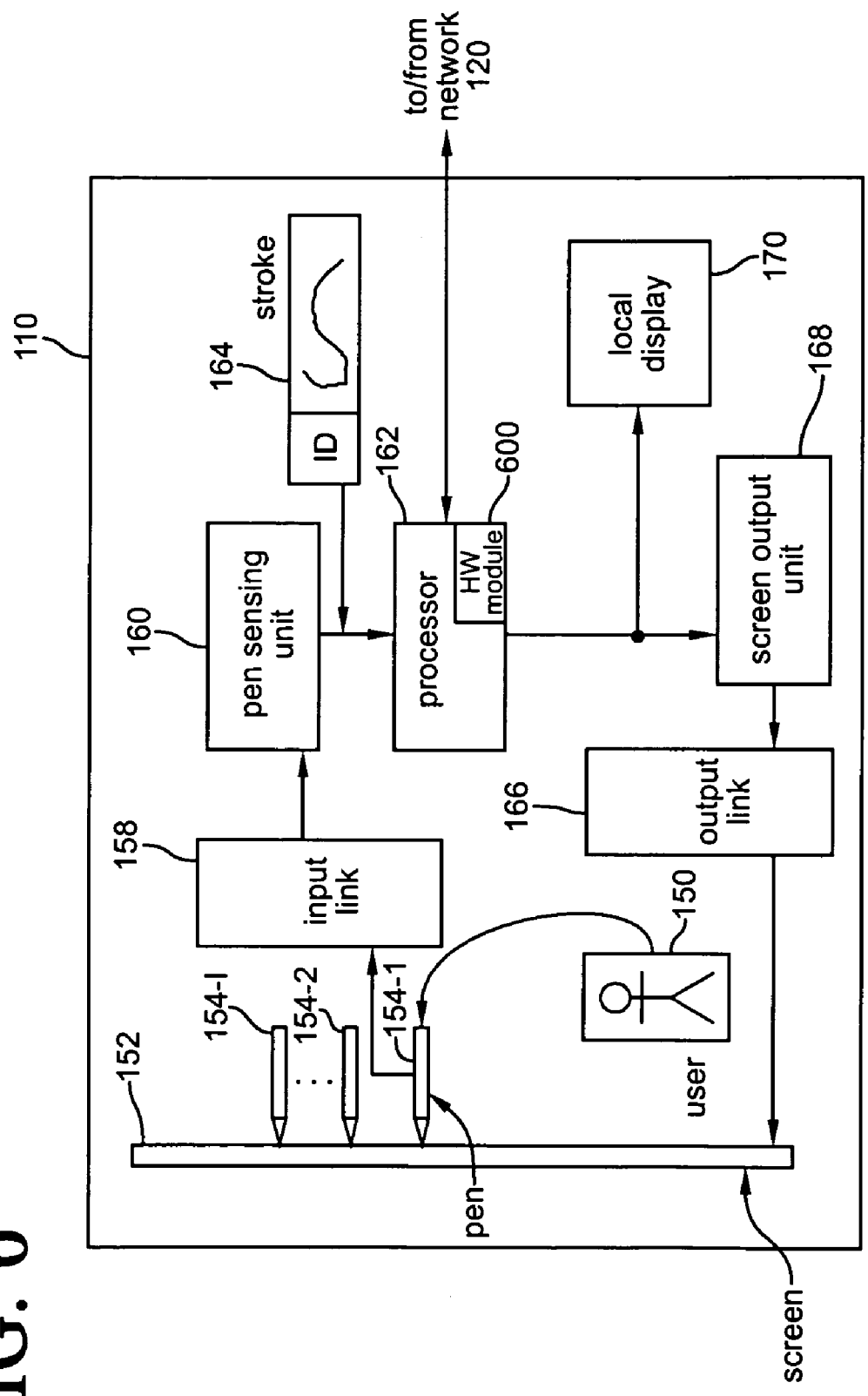
FIG. 6 is a block diagram illustrating user identification in a whiteboard system according to a fourth embodiment of the present invention.

In accordance with a fourth embodiment, the user's identification is inferred from the physical dynamics of handwriting after the data is contributed, as is done in signature verification and/or handwriting analysis. This is also passive identification. Such an embodiment is illustrated in FIG. 6. As shown, the user merely uses any one of the pens 154-1 through 154-I and his/her handwriting is analyzed in accordance with a handwriting analysis (HW) module 600 in the processor running a conventional handwriting analysis algorithm. While it is known that considerable processing power may be required to implement this embodiment, it has the advantage that all contributors can share a single input device. Further, the success of identification may be improved by using the writing dynamics of the user. If the temporal evolution of the stroke's quantized points is known, then the spectral characteristics of the stroke may be used to identify the user.

It is to be appreciated that stroke identification may also be based on other biometric techniques such as, for example, speech pattern and/or retinal pattern recognition, as are well known in the art of user recognition.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a distributed collaborative computing system with two or more collaborative computing devices coupled via a communication network and respectively executing a collaborative application thereon, the method comprising the steps of:

associating one or more identifiers with data units respectively entered by one or more users at least one of the two or more collaborative computing devices so that data entered by the one or more users is uniquely identifiable in the distributed collaborative computing system; and storing the data units and the one or more associated unique identifiers, the stored data units and the stored one or more associated unique identifiers being accessible to the two or more collaborative computing devices in the distributed collaborative computing system in accordance with the collaborative application.

2. The method of claim 1, wherein the two or more collaborative computing devices are whiteboard systems.

3. The method of claim 1, wherein the one or more identifiers are assigned to the one or more users before the data units are entered by the one or more users.

4. The method of claim 1, wherein the associating step is performed substantially contemporaneous with the entry of the data units by the one or more users.

5. The method of claim 1, wherein the associating step is performed after the data units are entered by the one or more users.

6. The method of claim 1, wherein the associating step further comprises determining an identifier to be associated with the data units entered by a user via an input device used by the user to enter the data units.

7. The method of claim 1, wherein the associating step further comprises determining an identifier to be associated with the data units entered by a user via a personal code automatically sensed through an input device used by the user to enter the data units.

8. The method of claim 1, wherein the associating step further comprises determining an identifier to be associated with the data units entered by a user via a biometric feature associated with the user entering the data units.

9. The method of claim 8, wherein the biometric feature comprises at least one of a fingerprint, a handwriting pattern, a speech pattern, and a retinal pattern extracted from the user.

10. The method of claim 9, wherein the biometric data is converted to compressed form and transmitted to a pen sensing unit.

11. Apparatus for use in accordance with at least one computing device of a distributed collaborative computing system with two or more collaborative computing devices coupled via a communication network and respectively executing a collaborative application thereon, the apparatus comprising:

at least one processor operative to: (i) associate one or more identifiers with data units respectively entered by one or more users at the at least one collaborative computing device so that data entered by the one or more users is uniquely identifiable in the distributed collaborative computing system; and (ii) store the data units and the one or more associated unique identifiers, the stored data units and the stored one or more associated unique identifiers being accessible to the collaborative computing devices in the distributed collaborative computing system in accordance with the collaborative application.

12. The apparatus of claim 11, wherein the two or more collaborative computing devices are whiteboard systems.

13. The apparatus of claim 11, wherein the one or more identifiers are assigned to the one or more users before the data units are entered by the one or more users.

14. The apparatus of claim 11, wherein the associating operation is performed substantially contemporaneous with the entry of the data units by the one or more users.

15. The apparatus of claim 11, wherein the associating operation is performed after the data units are entered by the one or more users.

16. The apparatus of claim 11, wherein the associating operation further comprises determining an identifier to be associated with the data units entered by a user via an input device used by the user to enter the data units.

17. The apparatus of claim 11, wherein the associating operation further comprises determining an identifier to be associated with the data units entered by a user via a personal code automatically sensed through an input device used by the user to enter the data units.

18. The apparatus of claim 11, wherein the associating operation further comprises determining an identifier to be associated with the data units entered by a user via a biometric feature associated with the user entering the data units.

19. The apparatus of claim 18, wherein the biometric feature comprises at least one of a fingerprint, a handwriting pattern, a speech pattern, and a retinal pattern extracted from the user.

20. Apparatus for use in accordance with at least one computing device in a distributed collaborative computing system with two or more collaborative computing devices coupled via a communication network and respectively executing a collaborative application thereon, the apparatus comprising:

one or more input devices used by one or more users to enter data units at the computing device;

user identification means for associating one or more identifiers with the data units respectively entered by the one or more users at the computing device so that data entered by the one or more users is uniquely identifiable in the distributed collaborative computing system; and memory for storing the data units and the one or more associated unique identifiers, the stored data units and the stored one or more associated unique identifiers being accessible to the collaborative computing devices in the distributed collaborative computing system in accordance with the collaborative application.

21. The apparatus of claim 20, wherein the user identification means includes a user settable switch associated with an input device for permitting the user to enter a unique identifiable code.

22. The apparatus of claim 20, wherein the user identification means includes a personal area network system associated with an input device for permitting automatic entry of a unique identifiable code.

23. The apparatus of claim 20, wherein the user identification means includes a biometric recognition system for permitting automatic identification of a user based on at least one biometric feature associated with the user.

* * * * *